Dec. 11, 1928.  1,695,259

E. W. TEMPLIN

RUNNING GEAR FOR MOTOR VEHICLES

Original Filed Oct. 19, 1921

INVENTOR
Ellis W. Templin,
BY
ATTORNEY

Patented Dec. 11, 1928.

1,695,259

UNITED STATES PATENT OFFICE.

ELLIS W. TEMPLIN, OF PHILADELPHIA, PENNSYLVANIA, ASSIGNOR TO THE GOODYEAR TIRE & RUBBER COMPANY, OF AKRON, OHIO, A CORPORATION OF OHIO.

RUNNING GEAR FOR MOTOR VEHICLES.

Original application filed October 19, 1921, Serial No. 508,844. Divided and this application filed November 10, 1925. Serial No. 68,164

My invention relates to running gear for power-driven vehicles having a plurality of driving axles, and more specifically it relates to a novel type of mechanism for interconnecting the chassis with the several axle housings of vehicles of the character designated.

This application is a division of my co-pending application Serial No. 508,844 filed October 19, 1921, which matured into Patent No. 1,565,527, on December 15, 1925.

The object of my present invention consists in providing a vehicle running gear of the character above described having an improved form of coupling between the axle housings and the chassis which is so designed as to aid in the transmission of the driving and braking forces to the vehicle wheels, and to relieve substantially the supporting springs, by which the chassis is yieldingly connected to and supported from the housings, from all torque and the driving and braking stresses. The couplings forming the subject matter of this divisional application comprise radius rods or bars which serve to retain the housings in the proper relative positions with respect to the chassis without restricting the relative movements of the housing ends as the vehicle passes over uneven surfaces.

Figure 1:
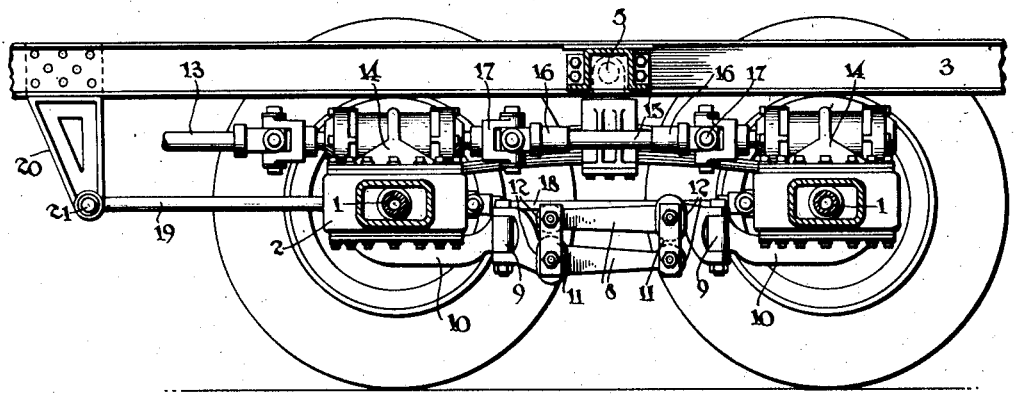
Figure 2:
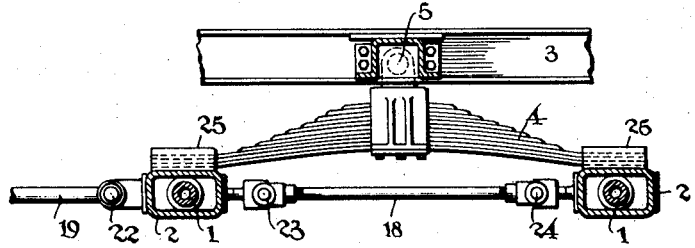

For a better understanding of my invention, reference may now be had to the accompanying drawings, of which:

Fig. 1 is a vertical sectional view of a truck or driving element of a vehicle of the character above described having my invention embodied therein; and Fig. 2 is a detail sectional view of a portion of the truck shown in Fig. 1, illustrating one form of connection between the spring ends and the axle housings and the relation of the coupling rods to the axle housings and to the supporting springs.

Referring particularly to the drawings, the individual driving axles 1 are each enclosed within axle-housings 2 which are freely mounted thereon. The housings 2 are connected to the frame or chassis 3 by means of leaf springs 4 which are preferably pivoted at their centers to the chassis, as indicated at 5, in such manner that both axles and their housings may oscillate as a unit about the pivotal connections, which are aligned to define a common horizontal axis.

As a result of the torque reactions in the axle housings caused by driving and braking torques, each of the housings tends to rotate about its wheel axle as an axis. This tendency to rotate may be resisted, without sacrificing the freedom of movement of the individual housings, by means of torque neutralizing mechanism, various forms of which are fully illustrated and described in my previously mentioned co-pending application. The form of torque neutralizing mechanism therein disclosed, comprises torque bars 8 which are arranged in such relation that the torque effects from one axle are directed to oppose the torque effects of the other. To this end the bars 8 are disposed in superposed parallel relationship, and are arranged longitudinally of the running gear, preferably in the median plane thereof. Each torque bar 8 is pivotally connected, as indicated at 9, to a lug or arm 10, extending from its associated housing, so as to swing about a vertical axis with respect thereto. The torque arms 8 are preferably connected to each other by means of vertically disposed links or shackles 11. The attachment between the arms 8 and the shackles 11 is preferably effected through interposed universal joints 12 of the ball and socket type. The torque neutralizing interconnections should preferably be somewhat resilient, which result is effected by mounting the members which form the sockets of the ball and socket joints upon coil springs or other resilient members, as disclosed in my co-pending application.

My improved coupling mechanism is adapted for use with a form of running gear embodying, as illustrated in Fig. 1, a drive shaft 13, which may be driven from any appropriate source of power, (not shown) and worm and worm-wheel transmission gearing mechanism for transmitting energy from the driving shaft 13 to the two wheel driving axles 1. These transmission mechanisms are enclosed within gear cases 14 supported by their associated axle housings 2. The gearing mechanism associated with the leading driving axle is connected to the worm of the trailing driving axle by means of a shaft 15, preferably rendered articulated by the inclusion of universal joints 17 and rendered extensible by means of splined telescoping connections 16, as shown. Driving gear of this character is more fully shown and described in the aforementioned prior application and, inasmuch as the driving mechanism forms no part of the invention herein claimed, it has not been described in detail herein.

In certain forms of my invention substantially all of the accelerating and decelerating forces are transmitted from the axle housings to the frame or chassis through the springs which form a yielding connection between the several housings, and between each of the housings and the chassis. In the modification herein specifically disclosed, the two housings are coupled to the chassis by means in addition to the springs, and the connections of the housings to the springs permit the necessary spreading of the ends of the springs as they are flexed without any corresponding movement of the housings.

The improved coupling for the housings illustrated in Fig. 1 comprises a radius rod 18, coupling the two housings to each other, and a radius rod 19 coupling the leading housing to an arm or lug 20, secured to the frame or chassis 3. The radius rod 18 is connected to the heading housing 2 by means of a universal joint 23 and to the trailing housing 2 by a similar joint 24. In like manner the rod 19 is connected to the leading housing 2 by a universal joint 22 and to the arm 20 by means of a universal joint 21. The radius rods are preferably invariable in length so as to serve as thrust rods as well as draw bars.

In order to provide for the spreading of the spring ends as the spring is flexed, notwithstanding the restrictions in the movements of the axle housings owing to their independent coupling with the chassis by means of the rods 18 and 19, the spring ends are slidably connected to the housings by means of socket or sleeve members 25 which prevent relative lateral or vertical movement but permit of a limited longitudinal movement of the spring ends therein. It will be understood that the rods 18 and 19 are disposed along substantially the center line of the housings 2, in order that the ends of the housings may have a limited relative movement with respect to each other in the plane determined by the axles 1.

Although I have illustrated but one form which my invention may assume, and have described in detail but a single application thereof, it will be apparent to those skilled in the art that it is not so limited but that various minor modifications and changes may be made therein without departing from the spirit of my invention or from the scope of the appended claims.

What I claim is:

1. A motor vehicle comprising a chassis, a plurality of driving axles disposed in parallel relationship, housings for said axles, resilient supporting means connecting said housings with said chassis, torque neutralizing interconnections between said housing permitting limited relative movement of each housing end independently of the remaining housing ends and adapted to cause the torque developed in each housing to oppose the torque developed in the other housing, and couplings comprising radius rods connecting said housings with said chassis without restricting the limited relative movements of said housing ends.

2. A motor vehicle comprising a chassis, a plurality of driving axles disposed in substantially parallel relationship, housings for said axles, yielding supporting means connecting said axles with said chassis, torque neutralizing inter-connections between said housings permitting relative movement of each housing end independent of the remaining housing ends and adapted to prevent rotation of said housings, and an articulated coupling extending from the chassis to the mid point of one of said housings and a radius rod connecting the mid points of said housings.

3. A motor vehicle comprising a chassis, a plurality of parallel driving axles, housings for the axles, resilient supporting means connecting the housings to the chassis, torque neutralizing means interconnecting the housings and adapted to permit limited relative movement of each housing end independently of any of the remaining housing ends and also adapted to cause the torque developed in each housing to oppose the torque developed in the other housing, a radius rod connected between the two housings and a second radius rod extending from the leading housing to the chassis.

4. A motor vehicle comprising a chassis, a plurality of rearwardly located driving axles, a housing freely mounted on each axle, a pair of supporting springs each extending between said housings and slidably connected thereto, each of said springs being pivotally connected to said chassis, a torque-neutralizing unit having one of its ends pivotally connected to each housing to swing in a horizontal plane and adapted to permit limited separational movement of the housing ends and to prevent any relative rotation of the housings.

5. In a vehicle chassis the combination with a frame and a plurality of live axles, of individual housings for the axles mounted freely thereon, universally jointed reach rods connecting the housings, springs mounted respectively upon the frame to oscillate about a horizontal axis, said springs having their respective end portions slidably connected to one of the housings, torque neutralizing mechanism connecting the housings adapted to yieldingly oppose the torque effects of one axle against such effects of the adjacent axle, and a radius rod connecting one of the housings to the frame.

In witness whereof, I have hereunto signed my name.

ELLIS W. TEMPLIN.